US008847545B2

(12) United States Patent
Williams (10) Patent No.: US 8,847,545 B2
(45) Date of Patent: Sep. 30, 2014

(54) SYSTEMS AND METHODS FOR AUTOMATICALLY INVOKING CERTAIN OPERATIONS IN MOBILE PHONES (75) Inventor: Rodney Owen Williams, Cary, NC (US)

(73) Assignee: HTC Corporation, Taoyuan, Taoyuan County (TW)

(*) Notice: Subject to any disclaimer, the term of this patent is extended or adjusted under 35 U.S.C. 154(b) by 855 days.

(21) Appl. No.: 13/073,900

(22) Filed: Mar. 28, 2011

(65) Prior Publication Data

US 2012/0252532 A1 Oct. 4, 2012

(51) Int. Cl.
*H02J 7/00* (2006.01)
*H04M 1/04* (2006.01)
*H04M 1/725* (2006.01)

(52) U.S. Cl.
CPC ............ *H04M 1/04* (2013.01); *H04M 1/72572* (2013.01); *H04M 1/72527* (2013.01)
USPC .......................................... 320/106; 320/115

(58) Field of Classification Search
USPC ................................................ 320/106, 115
See application file for complete search history.

(56) References Cited

U.S. PATENT DOCUMENTS

| 4,388,583 | A * | 6/1983 | Krueger ........................ 320/147 |
| 7,493,148 | B2 * | 2/2009 | Ha et al. ........................ 455/573 |
| 7,705,558 | B2 * | 4/2010 | Silverman ..................... 320/108 |
| 2004/0251878 | A1 | 12/2004 | Veselic |
| 2008/0315990 | A1 | 12/2008 | Komatsu |
| 2009/0100258 | A1 | 4/2009 | Sung |
| 2009/0108848 | A1 | 4/2009 | Lundquist et al. |
| 2009/0108854 | A1 | 4/2009 | Agevik et al. |
| 2009/0326821 | A1 | 12/2009 | Yomoda et al. |
| 2010/0205463 | A1 | 8/2010 | Magnusson |
| 2011/0234152 | A1 * | 9/2011 | Frossen et al. ................ 320/107 |

FOREIGN PATENT DOCUMENTS

| CN | 1993907 A | 7/2007 |
| CN | 101622553 A | 1/2010 |
| CN | 102823145 A | 12/2012 |
| JP | 2006279844 A | 10/2006 |
| TW | 200507602 | 2/2005 |
| TW | 200926629 | 6/2009 |
| TW | 201022943 | 6/2010 |
| TW | 201035727 | 10/2010 |
| WO | 2010144651 A1 | 12/2010 |

OTHER PUBLICATIONS

Taiwan Office Action dated Jan. 13, 2014.
China Office Action dated Dec. 4, 2013.
English translation of abstract of TW 201022943 (published Jun. 16, 2010).
English translation of abstract of JP 2006279844 A (published Oct. 12, 2006).

* cited by examiner

*Primary Examiner* — Richard V Muralidar
(74) *Attorney, Agent, or Firm* — McClure, Qualey & Rodack, LLP (57) ABSTRACT A system and method are described for automatically executing an application program in a mobile phone (or other electronic device) upon coupling of the mobile phone to a charging unit. The system and method operate to communicate a unique charging unit identification to the mobile phone and, in response, have the mobile phone execute a particular application program (or other command or mode of operation) that is associated with the particular charging unit.

13 Claims, 10 Drawing Sheets

SYSTEMS AND METHODS FOR AUTOMATICALLY INVOKING CERTAIN OPERATIONS IN MOBILE PHONES

TECHNICAL FIELD

The present disclosure generally relates to mobile phones and more particularly to a system and method for automatically invoking certain operations in a mobile phone.

BACKGROUND

Over the years, portable handheld devices such as smartphones have become prevalent. Indeed, smartphones have become an integral part of many people's lives given the portability of smartphones, the convenient access to the Internet, and the growing number of applications available. On a given smartphone, a user typically uses a variety of applications. With the growing number of applications, it is desired to provide a method for more efficiently invoking applications, or executing other operations, that are desired in certain situations.

SUMMARY

In one embodiment, an electronic device comprises a display for presenting visible information; a memory for storing application programs; processor circuitry for executing the application programs; charger detection logic for detecting the attachment of a charging unit; charging unit identifier logic configured to determine a unique identifier of the attached charging unit; and selecting logic configured to select and invoke a particular one of the plurality of application programs based on the unique identifier of the attached charging unit.

In another embodiment an electronic device comprises: a power input for receiving electrical power applied to the charging unit; a connector configured to couple with a mating connector of the electronic device; power conversion circuitry interposed between the power input and the connector configured to provide a power supply to an attached electronic device; device detection logic configured to detect the attachment of the electronic device; and identification logic configured to communicate a unique identification of the charging unit in response to the device detection logic detecting the attachment of the electronic device.

In yet another embodiment, a method executed by an electronic device comprises: receiving an identification number of a charging unit; determining a unique one of a plurality of application programs stored on electronic device that is associated with the identification number; and invoking the unique set of the plurality of application programs in response to the receiving of the identification number.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Having summarized various aspects of the present disclosure, reference will now be made in detail to the description of the disclosure as illustrated in the drawings. While the disclosure will be described in connection with these drawings, there is no intent to limit it to the embodiment or embodiments disclosed herein. On the contrary, the intent is to cover all alternatives, modifications and equivalents included within the spirit and scope of the disclosure as defined by the appended claims.

Applicant notes that the illustrated embodiments of the present invention are directed to mobile phones (and particularly smartphones). However, as will be appreciated by persons skilled in the art with reference to the description provided herein, the inventive concepts can be equally applied to other electronic devices, such as personal digital assistants (PDAs). Thus, the illustrated embodiments should not be taken as limiting upon the invention.

Figure 1:
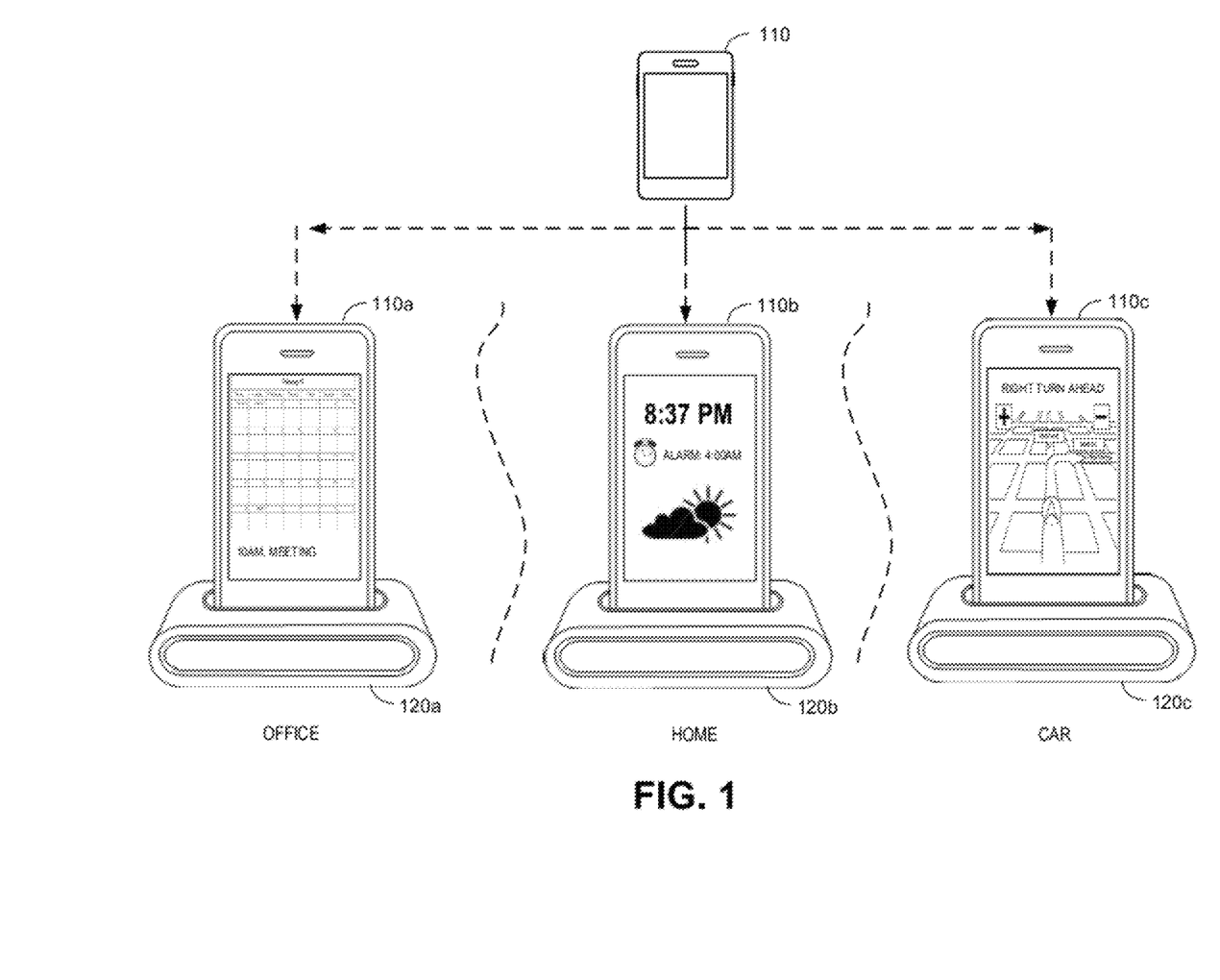
FIG. 1 is a diagram illustrating a system constructed in accordance with embodiments of the present invention.

Reference is made to FIG. 1, which is a diagram illustrating an environment system 100 in which the present invention may be implemented. Specifically, an environment that hosts embodiments of the present invention includes a mobile phone 110 and multiple charging units 120a, 120b, and 120c.

As is known, for many people, the use or utilization of a mobile phone is something of a constant throughout their daily activities. Whether at home, at work, or out engaging in a variety of personal activities, mobile phones have become an essential tool for many people. Particularly in the area of smartphones, a tremendous variety of applications are available to run on mobile phones. Examples of the wide variety of application programs that are available include e-mail and time-scheduling applications, GPS navigation applications, Web-surfing applications, as well as many, many more.

As a result of the ever-increasing number of applications, the amount of time a person spends utilizing his or her mobile phone is increasing accordingly. This increased use imposes an increased demand on the phone's battery. Indeed, many present smartphone batteries will not maintain a charge throughout an entire day, when under moderate to heavy use. Consequently, users frequently keep a charger handy in order to maintain an adequate charge on the phone. Indeed, many users have multiple chargers that they keep in different locations (e.g., office, home, car, etc.) where they spend a fair amount of time, so that they have a charger handy to keep the mobile phone charged.

In accordance with embodiments of the present invention, systems and methods are provided whereby a phone 110 is configured such that the phone can identify specific or unique chargers and invoke or execute application programs that are specific to a given charger. For example, a charging unit 120a at a user's office may cause the phone 110a to invoke or execute a daily scheduler application program. A charging unit 120b at a user's home may cause the phone 110b to invoke or execute a time of day (or clock display) application program. Likewise, a charging unit 120c located in a user's car may cause the phone 110c to invoke or execute a GPS navigation application program.

As will be described in more detail herein, upon connecting the phone 110 to a charging unit (e.g. 120a), the charging unit communicates to the phone 110 an identification number (or other indicia) that is unique to the particular charging unit. If the phone 110 has not been previously coupled to this particular charging unit, the phone 110 may be configured to prompt the user to select a default application program that would be automatically invoked the next time the phone 110 is coupled to that particular charging unit. Of course, the default application program could be changed at the user's instruction. In alternative embodiments, the phone 110 may simply set the default application program to whatever program was executing at the time that the phone 110 was previously disconnected from the charging unit. As will be appreciated by persons skilled in the art, particularly in view of the discussion herein, a variety of different configurations may be implemented consistent with the scope and spirit of the present invention. What is relevant, from a broader inventive standpoint, is that a system and method are provided whereby a phone 110 can distinguish among a plurality of different charging units 120a, 120b, and 120c, and invoke or execute particular application programs (or modes of operation) based upon the identity of a connected charging unit.

Figure 2A:
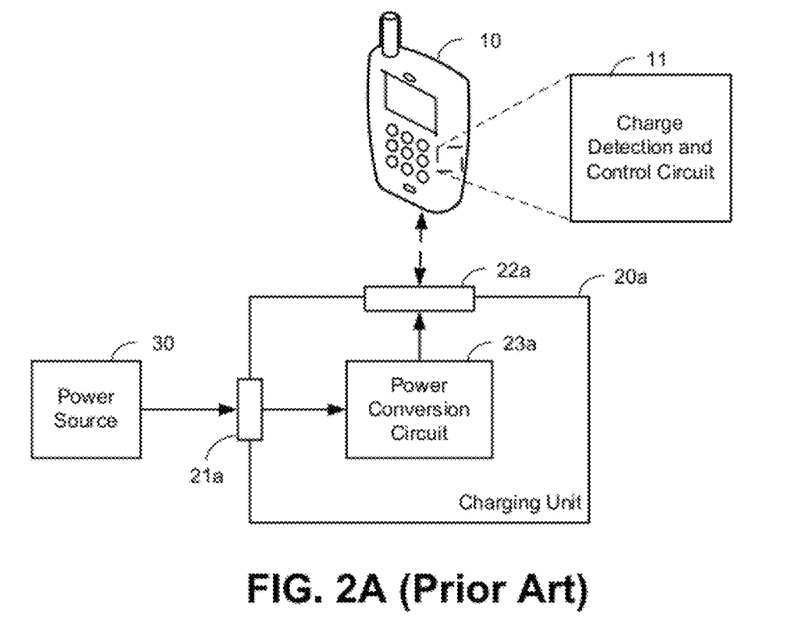
FIGS. 2A and 2B are diagrams illustrating different forms of charging units and a phone in accordance with the prior art.

Reference is made to FIG. 2A, which is a diagram illustrating a conventional charging unit 20a and mobile phone 10, as will be known to persons skilled in the art. Briefly, a conventional charging unit 20a may have a connector 21a for coupling the charging unit 22a to a power source 30. In many systems, there may be no separate connector 21a, but rather simply a power cord that is affixed to the charging unit 20a and having a distant end in the form of plug that is to be inserted into a wall outlet or receptacle. In this regard, frequently conventional 110 volt AC power is supplied to power the charging unit 20a.

A separate phone connector 22a is provided for attachment with a mating connector provided on the phone 10. Frequently, charging units are provided in the form of a base (often referred to as a cradle) which supports the phone 10 in a standing or upright position when the phone 10 is mated with the phone connector 22a. A power conversion circuit 23a is provided in the charging unit 20a and is interposed between the power source 30 and phone connector 22a. As will be appreciated by persons skilled in the art, power conversion circuits are well known and therefore the details of this circuitry need not be described herein. Suffice it to say that typically charging units 20a are designed with a power conversion circuit 23a that is appropriate for dispensing the proper power supply to a particular charging circuit and battery that will be within the phone 10. As is also known, the phone 10 will include a charge detection circuit 11 which detects the presence or coupling of the power conversion circuit 23a.

Figure 2B:
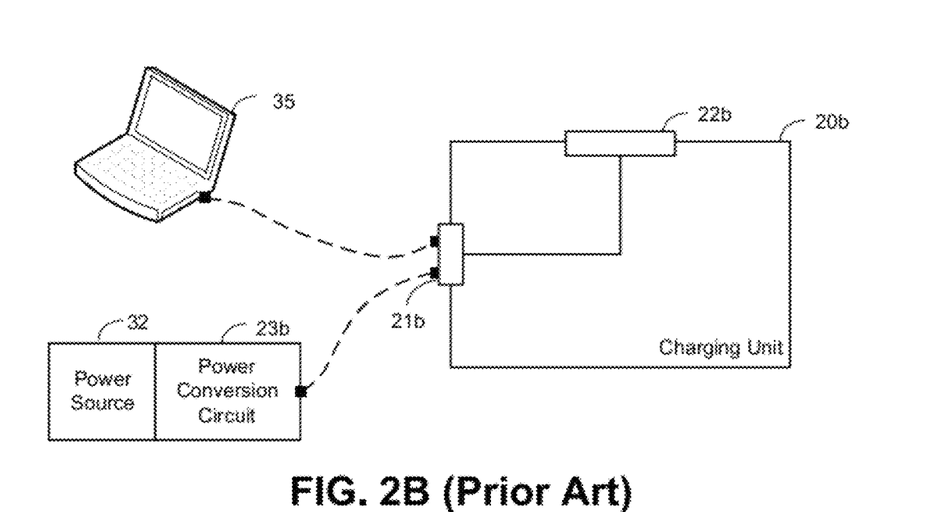

Reference is made to FIG. 2B, which is a diagram illustrating another type of conventional charging unit 20b. In this embodiment, rather than the charging unit 20b being coupled to a power outlet, it is instead attached to a power source 32, having a built-in (or associated) power conversion circuit 23b. Alternatively, the charging unit 20b may instead be connected to a computer 35 (e.g., via a USB port), which includes its own power source and power conversion circuit. In such an embodiment, the charging unit need not include an internal power conversion circuit.

As the various circuitry and components illustrated in FIGS. 2A and 2B are known by persons skilled in the art, details regarding the structure or operation of these components need not be described herein.

Figure 3:
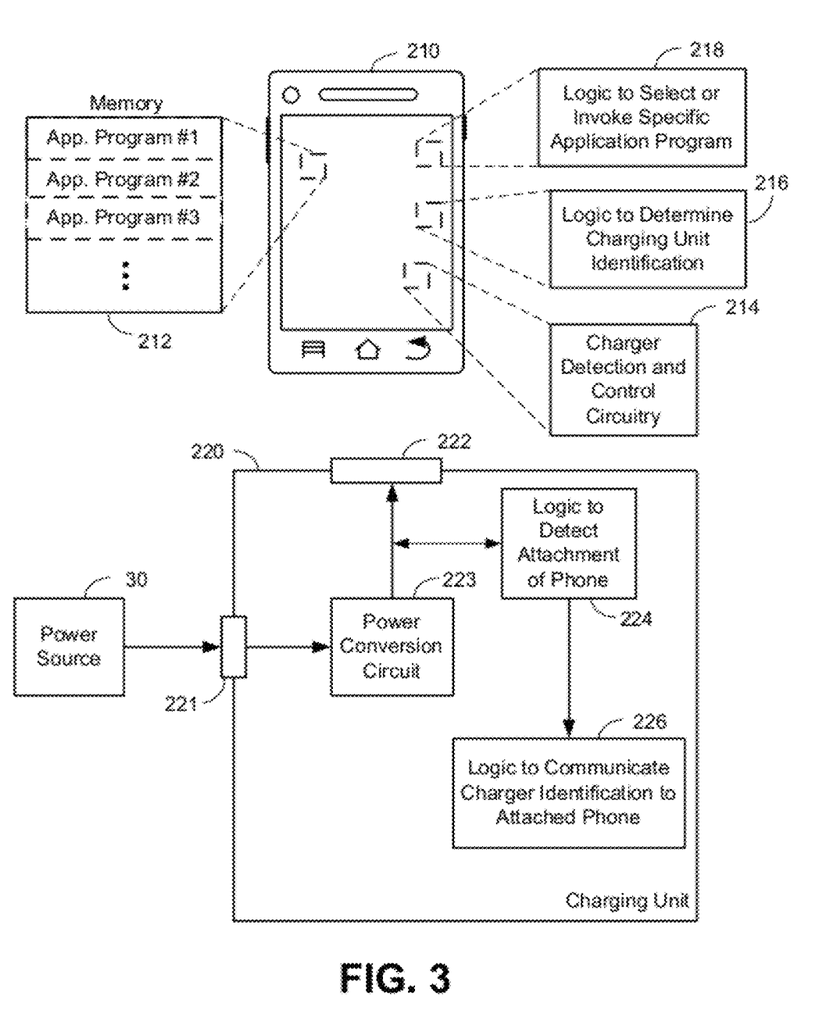
FIG. 3 is a diagram illustrating a charging unit and a phone constructed in accordance with an embodiment of the present invention.

Reference is now made to FIG. 3, which is a diagram illustrating an embodiment of the present invention. In this embodiment, certain novel features of both a mobile phone 210 and a charging unit 220 are shown. The mobile phone includes a memory 212 which stores a plurality of application programs that may be executed by processing circuitry (not specifically shown) on the mobile phone 210. The mobile phone 210 also includes charger detection and control circuitry 214. Mobile phones of the prior art are known to be able to detect when the mobile phone is connected to a charging unit. Therefore, the charger detection and control circuitry 214 may be implemented in a variety of ways, including ways already known and understood by persons skilled in the art. Accordingly, details regarding the charger detection and control circuitry 214 need not be described herein.

Mobile phone 210 also includes circuitry or logic 216 to determine a particular identification of the charging unit 220. Certain embodiments of this logic 216 will be further described herein, however, from a functional standpoint, in an embodiment of the present invention, logic 216 operates to obtain a particular identification number that is unique to the charging unit 220 that is connected with the mobile phone 210. Finally, the mobile phone 210 of the embodiment of FIG. 3 includes circuitry or logic 218 to select or in invoke a particular one (or more) of the plurality of application programs stored in memory 212. Specifically, this invocation is based upon the identification of the particular charging unit 220 as determined by logic 216.

As described in connection with FIG. 1, the identification of a particular charging unit (e.g., 120a of FIG. 1) may cause the mobile phone 210 to select, invoke, and/or execute a scheduling program. The same mobile phone 210, however, upon detection of a different charging unit (e.g., 120b of FIG. 1) may cause the mobile phone 210 to select, invoke, and/or execute an application program that displays a time of day clock. Further still, upon detection of yet a different charging unit (e.g., 120c FIG. 1), the mobile phone to 10 may select, invoke, and/or execute an application program that displays a GPS navigation tool. The foregoing application programs have been presented merely for purposes of illustration. As is known, there are a tremendous variety of application programs available for execution on mobile phones, and any of the variety of such application programs may be invoked upon the detection of a particular charging unit.

Consistent with the scope and spirit of the present invention, in addition to invoking or executing a particular application program, a mobile phone 210 may also operate to execute a specific command or action, in response to the detection of a particular charging unit. For example, upon detection of a certain charging unit, the mobile phone may immediately enter a password-protected state. Alternatively, the mobile phone may be placed in a silent mode by reducing the speaker volume upon detection of a particular charging unit. Thus, in addition to (or in the alternative) executing a particular application program in response to the detection of a particular charging unit, the mobile phone 210 of certain embodiments may also (or instead) cause particular commands or actions to be carried out—one or more of which may relate to content of the device, for example the current weather conditions.

Also illustrated in FIG. 3 is a charging unit 220 constructed in accordance with an embodiment of the invention. As with charging units of the prior art, charging unit 220 is coupled to a power source 30 by a connector 221. Alternatively, the charging unit 220 may have a permanently attached power cord with a plug on the distal end for insertion into a power outlet. The charging unit 220 also has an electrical connector 222 for coupling the charging unit 220 with the mobile phone 210. If the charging unit 220 is a cradle-type charging unit, then the mobile phone 210 may be docked directly on the connector 222 of the charging unit 220 via a mating connector (not specifically illustrated in FIG. 3) of the mobile phone 210. As with charging units of the prior art, charging unit 220 includes a power conversion circuit 223 that is interposed between connectors 221 and 222 (or remotely located near the power outlet). As power conversion circuits for mobile phones are well known in the art, details regarding power conversion circuit 223 need not be described herein.

The charging unit 220 of the illustrated embodiment also includes circuitry or logic 224 configured to detect the attachment of a mobile phone. As will be described further herein, this logic 224 can be implemented in any of a variety of ways, consistent with the scope and spirit of the present invention. What is significant for purposes of the illustrated embodiment is that logic 224 operates to generate a signal indicative of the presence of a mobile phone 210.

The charging unit 220 further includes circuitry or logic 226 that communicates a unique identifier for the charging unit 220 to the attached (or coupled) mobile phone 210. The identifier (or identification number) may be established or generated in any of a variety of ways. For example, it may be a hard-wired via dual in-line (DIP) switches, or it may be generated through an initial, random number sequence generator. Further still, the identification number may be generated as a result of a communication exchange between the charging unit 220 and the mobile phone 210. For example, every charging unit could have an initial, default value. Upon communication of that value to the mobile phone, the mobile phone could communicate back to the charger a value to be assigned. This could ensure that no two charging units (for a given mobile phone) have the same identification number.

Consequently, logic 226 may be implemented in a variety of ways. Again, what is significant for purposes of the illustrated embodiment is that a unique identifier (or identification number) that serves to uniquely identify the charging unit 220 is communicated to a coupled mobile phone 210.

Figure 4:
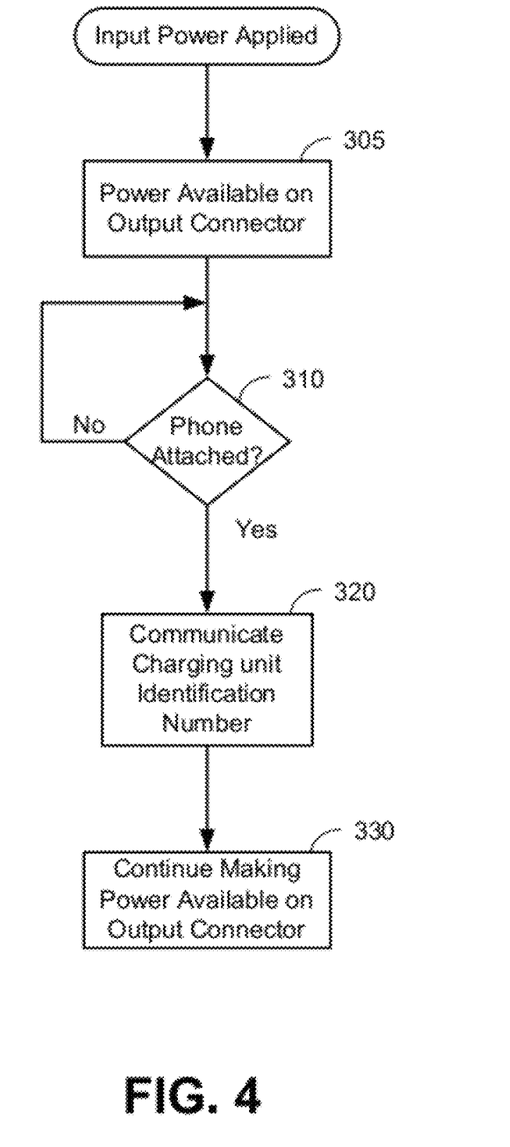
FIG. 4 is a flowchart of certain operations executed in a charging unit constructed in accordance with an embodiment of the present invention.

Reference is now made to FIG. 4, which is a flow chart illustrating the top-level operation of the charging unit constructed in accordance with an embodiment of the present invention. At a broad level, the charging unit operates to detect the attachment (or coupling) of a mobile phone (step 310). Upon detection of the attachment or coupling of the mobile phone, the charging unit then communicates an identification number associated with that particular charging unit to the attached or coupled mobile phone (step 320). All the while, the charging unit operates in accordance with conventional charging units by applying power at the output connector to charge the attached mobile phone (steps 305 and 330). In this regard, it will be appreciated that the flowchart is merely illustrative of functional operation, as opposed discrete steps carried out by the charging unit.

Figure 5:
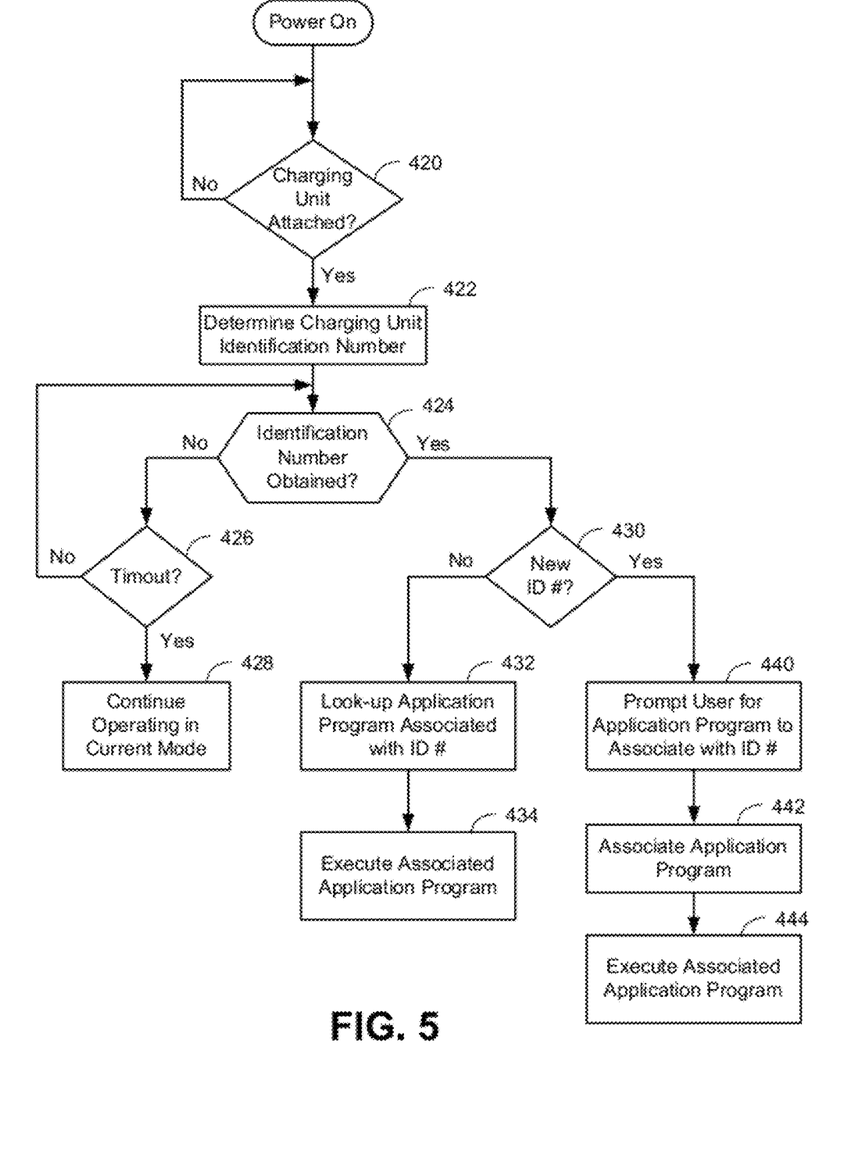
FIG. 5 is a flowchart of certain operations executed in a phone constructed in accordance with an embodiment of the present invention.

Reference is now made to FIG. 5, which is a flow chart illustrating the top-level of a mobile phone constructed in accordance with an embodiment of the present invention. In this embodiment, the mobile phone operates to determine whether the mobile phone is attached to a charging unit (step 420). As prior art mobile phones can detect the presence of the charging unit, it will be appreciated by persons skilled in the art that the overall functional operation of the mobile phone, constructed in accordance with the present invention, is consistent with that of prior art mobile phones. Further, the detection of an attached charging unit is also known in the prior art and therefore step 420 may be implemented in manners that are similar or consistent with prior art mobile phones.

Unlike prior art mobile phones, however, a mobile phone constructed in accordance with the embodiment of FIG. 5 determines a particular identification number (or other indicia) of the charging unit that is attached to the mobile phone (step 422). In one embodiment, step 422 is carried out by merely receiving an identification number that is directly communicated by the attached charging unit. As it is desired that an inventive mobile phone operate with conventional charging units, it is recognized that a conventional charging unit would not have an associated unique identification number. Therefore, as reflected in steps 424 and 426 of FIG. 5, if a timeout period elapses before any such identification number is obtained or determined by the mobile phone, then the mobile phone can continue operating in its current mode (step 428), or in a default mode that the mobile phone may be configured to operate in, upon connection with the charging unit.

If, however, the mobile phone detects or receives a unique identification number for the charging unit, then the mobile phone determines whether this is a new identification number, or whether the mobile phone has been connected to the particular charging unit in the past (step 430). If the identification number is not new (meaning that the mobile phone has been connected to this particular charging unit in the past), then the mobile phone determines (e.g., via a lookup table) a particular application program (or mode of operation) that is associated with the charging unit identification number (step 432). The mobile phone then invokes or executes the application program that is associated with the particular charging unit, as identified by the charging unit identification number (step 434).

If, however, the particular charging unit has not been previously associated with the mobile phone (as reflected by a new identification number in step 430), then the mobile phone may prompt the user accordingly. In this regard, the mobile phone may present (via its display) a message to the user and query the user as to whether the user desires to associate a particular application program for execution, while the mobile phone is coupled to this particular charging unit (step 440). If so, the mobile phone then associates and identified application program with the new identification number that was received from the coupled charging unit (step 442). Thereafter, the mobile phone may proceed by executing the associated application program (step 444).

In the alternative, rather than specifically prompting the user to associate a given application program with the attached charging unit, the phone may simply continue to operate in either its current mode of operation or in a default mode of operation while charging. However, if the user directs the phone to execute a certain application program, then that application program may thereafter be a designated program that is associated with the particular charging unit. In this mode of operation, whatever application program is being executed by the mobile phone at the time that the mobile phone is disconnected from the charging unit, then that particular application program would be re-invoked for execution the next time the user connected the mobile phone to that charging unit.

Figure 6:
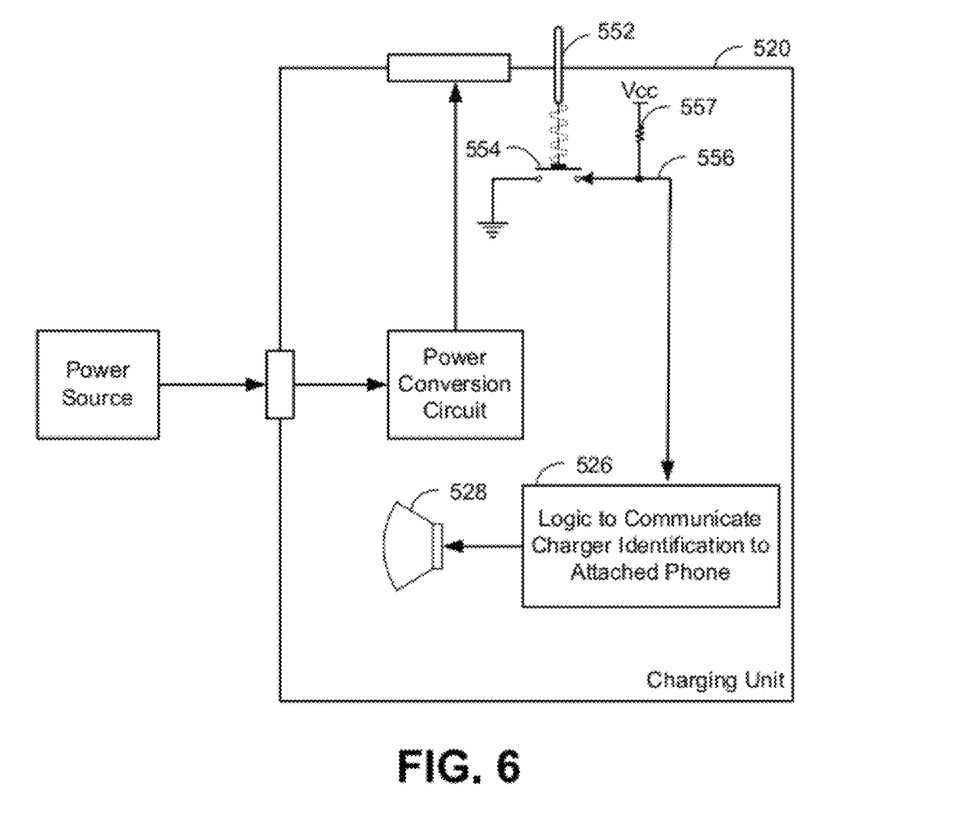
FIG. 6 is a diagram illustrating elements of a charging unit constructed in accordance with an embodiment of the present invention.

In addition to (or in the alternative to) the execution of an application program, the mobile phone may be configured to enter a certain mode of operation while connected to a particular charging unit. For example, a user may desire that the ringer volume be turned very low level, or even muted, when coupled to a particular charging unit. In accordance with certain embodiments of the invention, if a user configures the mobile phone for a certain mode of operation while connected to a particular charging unit, the mobile phone may operate to self-configure itself into the same mode each time it is subsequently reattached to the same charging unit. Reference is now made to FIG. 6, which is a diagram similar to the diagram of FIG. 3, and additionally illustrating one embodiment for detecting the presence of a mobile phone. In this embodiment, a simple spring-loaded detection pin 552 may be coupled to circuitry that generates a detection signal on a signal line 556 that is input into the logic or circuitry 526 that operates to communicate the unique charger identification number to the attached mobile phone. In one implementation, a pull-up resistor 557 may be coupled to the signal line 556 to keep the signal line 556 and a logic high state whenever a mobile phone is not attached to the charging unit 520. However, when the mobile phone is attached to (or docked with) the charging unit 520, the housing of the mobile phone may cause the detection pin 552 to be depressed. The detection pin 552 may be coupled to a switch 554, such that when the detection pin 552 is depressed by an attached mobile phone, then the switch 554 is closed. In the configuration illustrated in FIG. 6, closure of the switch 554 would result in the signal line 556 being brought to a logical low state. Thus, in the embodiment of FIG. 6, a logical low state of signal line 556 indicates the attachment or coupling of a mobile phone to the charging unit 520, and a logic high state of the signal line 556 indicates that no phone is currently attached to the charging unit 520.

Circuitry or logic 526 is also provided to communicate the unique identification number of the charging unit 520 to the attached mobile phone. In one embodiment, this identification number is communicated at (or within) a predetermined time period after detection of the attachment of the phone. In an embodiment illustrated in FIG. 6, the identification number is communicated to the mobile phone by way of a speaker 528. In this regard, the identification number may be communicated to the attached mobile phone by way of an acoustic transmission. Of course the acoustic transmission or sound may be within, or outside of, the audible range of human hearing. In a preferred embodiment, however, the speaker 528 will be controlled to operate to produce sound that is within the dynamic range of a microphone of the mobile phone that is attached. In this way, additional circuitry need not be added to the mobile phone to equip the mobile phone to operate with charging unit 520. Instead merely firmware updates, or application software, need be added to the phone in order to effect cooperation with the charging unit 520. In this regard, it is appreciated that every mobile phone has a built-in microphone (i.e., the microphone that a user speaks into). This same microphone can be used to receive the acoustic transmission that is communicated by speaker 528.

As will be appreciated by persons skilled in the art, there are a variety of ways in which an identifier of the charging unit 520 may be communicated via the speaker 528. In this regard, there are a variety of ways in which an identification number may be digitized and communicated over an analog device (such as a speaker 528) to communicate that digital data to the attached mobile phone, which is received via the built-in microphone of the phone.

In one embodiment, the acoustic transmission from the charging unit to the mobile phone includes the device identification number applied as an acoustic watermark and superimposed over a musical or otherwise audibly pleasing audio sequence. The watermark data being spread across the audio spectrum, preferably ranging from 500 Hz or below to 5 KHz or above, and imperceptible to the human ear as being carried by the audio sequence. In this example, different charging units would be perceived to make the same acoustic transmission to a human listener. As will be appreciated by persons skilled in the art, the sound pressure level from the speaker need only be sufficient to excite the microphone circuit in the mobile phone with enough signal to interference to be reliably decoded.

In another embodiment, the device identification number is sent as a binary sequence in which a number of pairs of audible tones are sent simultaneously. Each pair of tones represents a one and zero level, therefore only one frequency from each pair is sent at any given instant. Sending multiple pairs increases the likelihood of proper reception in the presence of audio interference. A 24 bit identification number sent at a rate of 100 bits per second could be sent at least twice in a one second period with a preamble and frequency calibration portion included for further detection assurance.

The foregoing examples have been provided for illustration. Of course, alternative structures and methods for communicating the identification of a charging unit may be employed consistent with the scope and spirit of the present invention.

It will also be appreciated by persons skilled in the art, that the charging unit identification number may be communicated to an attached mobile phone in alternative ways as well. In one such alternative embodiment, not specifically illustrated, the identification number may be directly communicated to the attached mobile phone via data lines provided through the connector 522. Such data lines may vary from phone to phone, but it is known that many phones (including smartphones) have data lines that allow the phone to communicate with various coupled devices (e.g., a coupled computer). Those same data lines may be used to digitally communicate a charging unit identification number to a coupled mobile phone.

Figure 7:
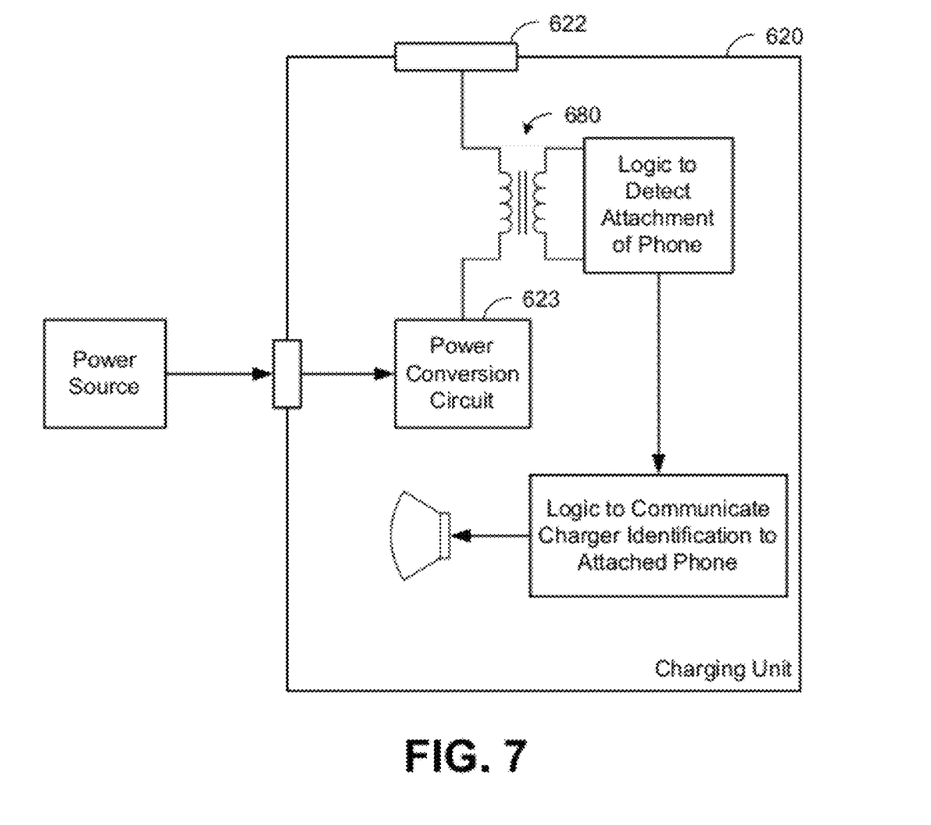
FIG. 7 is a diagram illustrating elements of a charging unit constructed in accordance with an embodiment of the present invention.

Reference is now made to FIG. 7, which is a diagram similar to the diagram of FIG. 6, but illustrating an alternative way of detecting the attachment of a mobile phone. In the embodiment illustrated in FIG. 7, one or more signal lines extending between the power conversion circuit 623 and connector 622 may indicate the presence of an attached phone. For example, sense resistors (not shown) may be implemented to detect the flow of current that would be present in an electrical conductor that provides the charging current to the attached phone. When no phone is attached, no current would be flowing through that conductor. However, once a phone is attached in charging current begins to flow. Sensing that flow of current could provide the necessary "trigger" for the charging unit 620 to detect the attachment of a phone. Alternatively, logic or circuitry may be coupled to a charging conductor by way of an inductor or transformer 680 that responds to the change in the current flow when the phone is first attached.

In short, there are a variety of ways in which the attachment of a phone to the charging unit 620 may be depicted, consistent with the scope and spirit of the present invention.

Figure 8:
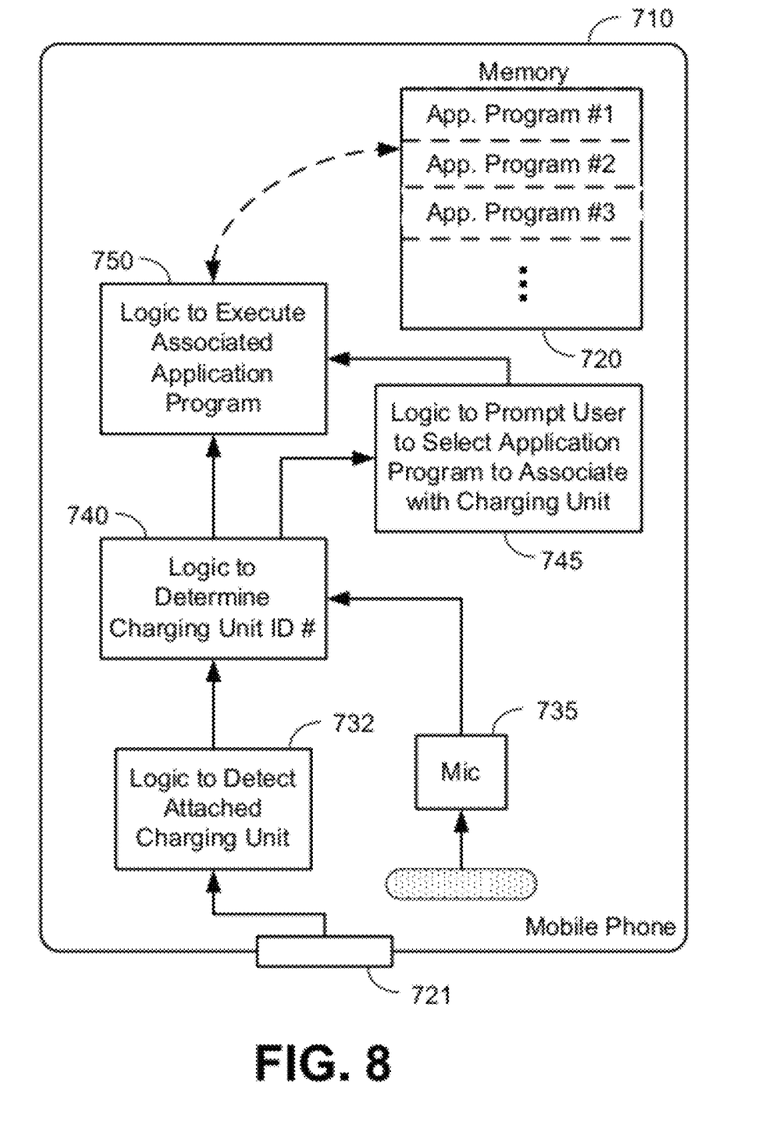
FIG. 8 is a diagram illustrating elements of a phone constructed in accordance with an embodiment of the present invention.

Reference is now made to FIG. 8, which illustrates a mobile phone 710 constructed in accordance with an embodiment of the invention. As described in connection with FIG. 3, the mobile phone 710 may include memory 720 storing a plurality of application programs. As previously described, the mobile phone 710 may include a connector 721 which allows the mobile phone to connect to external devices, such as a computer, charging unit, docking station, etc. the mobile phone 710 includes logic 730 to detect and attached charging unit. As previously described, this particular feature is known in the prior art, and therefore need not be described.

The mobile phone 710 also includes logic or circuitry 740 to determine or receive a particular identification number that is unique to an attached charging unit. In certain embodiments, logic 740 operates in response to logic 732, such that after logic 732 detects the presence of the charging unit, logic 740 then "listens" for a charging unit identification number. In one embodiment, the identification number is received via the built-in microphone 735 provided in the mobile phone 710. As described in connection with FIG. 6, the attached charging unit may communicate its identification number through the use of the speaker that is controlled to operate at frequencies that are within the dynamic range of microphone 735. In response to the determination of a unique identification number, the mobile phone 710 may prompt a user (through logic 745) to associate a particular application program, command, and/or mode of operation with the particular charging unit is attached. The mobile phone 710 may further include logic 750 that operates to execute an associated application program, command, or mode of operation, in response to the detection of a particular charging unit identification number.

Although FIGS. 6, 7, and 8, have illustrated the use of a speaker and microphone for the communication of a charging unit's identification to an attached mobile phone 710, it will be appreciated by persons skilled in the art that a variety of other mechanisms may be employed to achieve this inventive functionality. For example, dedicated circuitry may be provided within both the charging unit and the mobile phone such that identification of the charging unit may be communicated directly to the mobile phone by way of their electrical attachment (e.g., through data lines that are connected through their respective electrical connection). Alternatively, an ultrasonic transmitter-receiver pair may be implemented in the charging unit and mobile phone, respectively. Likewise, an infrared transmitter-receiver pair may be implemented in the charging unit and mobile phone, respectively. Numerous other devices and ways of implementing this broad, inventive functionality may similarly be employed, consistent with the scope and spirit of the present invention.

It will be further appreciated that numerous implementation details have been omitted herein, as they are not necessary for a complete and proper understanding of the present invention. As one simple illustration, as it may generally not be desired for a charging unit to continually broadcast its identification number, when no mobile phone is attached, certain embodiments of the invention may be configured such that a charging unit only broadcasts this information within (or for) a predetermined period of time after the mobile phone has been attached to the charging unit. Likewise, the mobile phone may be configured to "listen" for a charging unit identification number only within (or for) a predetermined period of time after the mobile phone has detected the presence or attachment of the charging unit.

In one embodiment, the approximate proximity of the charger could be determined by an amplitude of the electrical signal generated by the microphone of the mobile phone, based on a priori knowledge by the mobile phone of the volume level of the audible signal that is emitted from the charging unit.

The foregoing embodiments have described inventive systems that operate in response to the attachment of a mobile phone with the charging unit. It will be appreciated, however, that the present invention may similarly operate by detecting the proximity of a particular charging unit (or other device) with the mobile phone. By way of illustration, it was described in connection with FIG. 1 that a user may generally desire for a mobile phone to enter a GPS navigation mode of operation when in an automobile. Therefore, the embodiment of FIG. 1 described the execution of a GPS navigation application program in response to the coupling of an automotive charging unit with a mobile phone. It may similarly be desired to execute that same GPS navigation application program when the mobile phone is in the car, even though the mobile phone is not attached to the charging unit that is located in the car. By detecting the proximity of the charging unit, however, the mobile phone may, however, be configured to execute the same GPS navigation application program. Similarly, the detection of the close proximity of other charging units (or devices) may similarly cause the mobile phone to execute certain application programs (e.g., scheduling programs, time of day clock programs, etc.).

Figure 9:
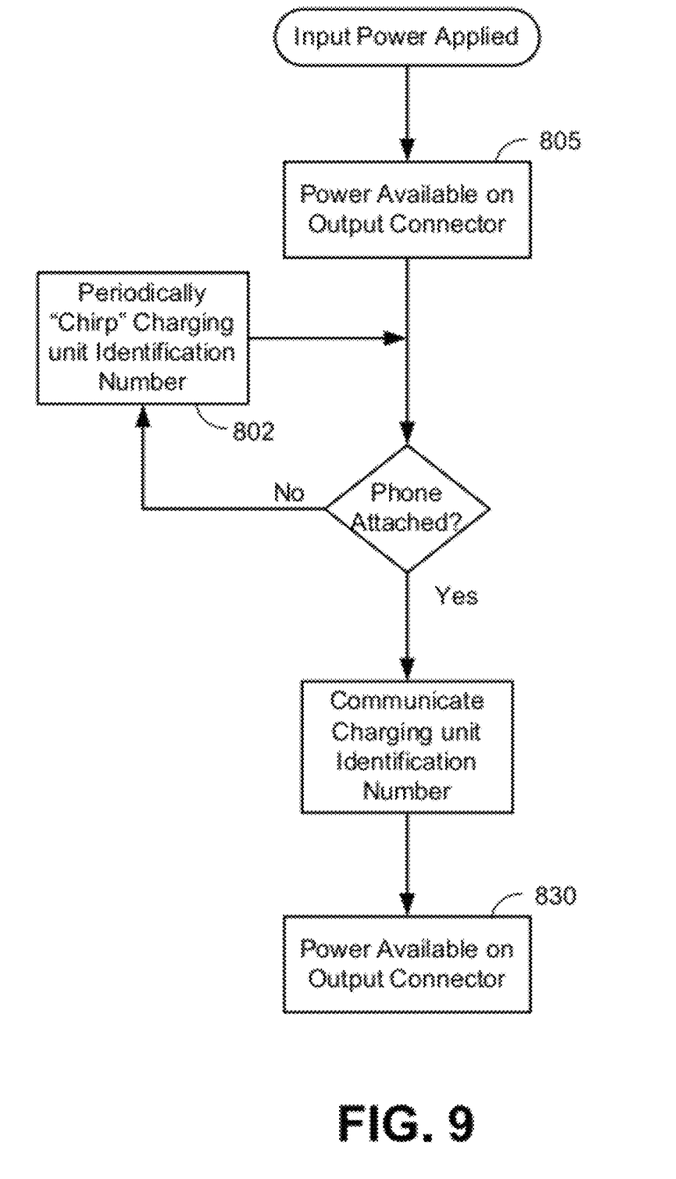
FIG. 9 is a flowchart of certain operations executed in a charging unit constructed in accordance with an embodiment of the present invention.
Figure 10:
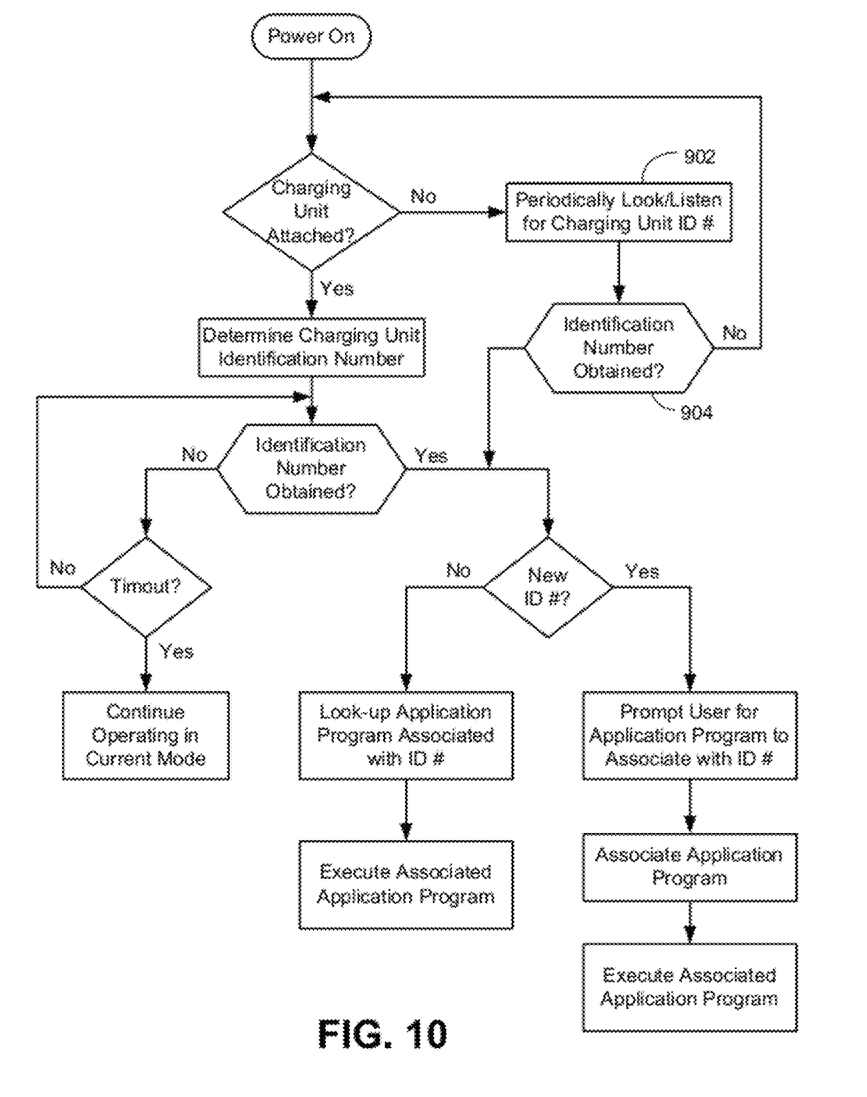
FIG. 10 is a flowchart of certain operations executed in a phone constructed in accordance with an embodiment of the present invention.

Thus, consistent with the embodiments described herein, a charging unit may be configured to periodically broadcast or "chirp" its identification number, regardless of whether a mobile phone is attached or not. Similarly, a mobile phone may be configured to periodically "listen" for such a chirped signal to change its mode of operation accordingly. Consistent with this embodiment, reference is made briefly to FIGS. 9 and 10, which are flowcharts similar to the flowcharts of FIGS. 4 and 5. As the flowcharts of FIGS. 9 and 10 are similar to those of FIGS. 4 and 5, a detailed explanation of these flowcharts need not be repeated herein. Instead, only the slight differences in these flowcharts are described.

For example, as illustrated in FIG. 9, a charging unit may be configured to periodically broadcast (or "chirp") its identification number (step 802). Again, as with FIG. 4, throughout the operation of the charging unit, as long as input power is applied, the charging unit will operate to apply output power (steps 805 and 830) to an output connector for delivery to an attached device. Likewise, as illustrated in FIG. 10, a mobile phone may be configured (even when not attached to a charging unit) to periodically "listen" for a charging unit identification number (step 902), and upon detection of that number (step 904) proceed to execute an associated application program (or enter into associated mode of operation).

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

The invention claimed is:

1. An electronic device comprising:
a display for presenting visible information;
a memory for storing a plurality of application programs;
processor circuitry for executing the application programs;
charger detection logic for detecting the attachment of a charging unit;
charging unit identifier logic configured to determine a unique identifier of the attached charging unit, wherein the charging unit identifier logic is configured to receive an electrical signal output from a microphone of the electronic device; and
selecting logic configured to select and invoke a particular one of the plurality of application programs based on the unique identifier of the attached charging unit.

2. The electronic device of claim 1, wherein the electronic device is a mobile phone.

3. The electronic device of claim 1, wherein the charging unit identifier logic further includes signal detection logic configured to evaluate the electrical signal from the microphone to detect and discern a particular identifier value that is communicated to the microphone within a predetermined frequency band.

4. The electronic device of claim 3, wherein the predetermined frequency band is an audible frequency band.

5. The electronic device of claim 3, wherein the predetermined frequency band is an inaudible frequency band.

6. The electronic device of claim 1, further comprising association logic configured to associate at least one of the application programs with a given identifier of the attached charging unit.

7. The electronic device of claim 6, wherein the association logic is configured to control the electronic device to prompt a user to select one or more of the plurality of application programs to associate with the attached charging unit, if the association logic determines that no application program is presently associated with the attached charging unit.

8. A method executed by an electronic device comprising:
receiving an identification number of a charging unit;
determining a unique set of a plurality of application programs stored on the electronic device that is associated with the identification number; and
invoking the unique set of the plurality of application programs in response to the receiving of the identification number,
wherein the receiving step more specifically comprises:
monitoring an electrical signal output from a microphone that is embodied in the electronic device;
identifying a modulated signal within a predetermined frequency band, the modulated signal embodying the identification number.

9. The method of claim 8, further comprising:
detecting the attachment of the charging unit with the electronic device.

10. The method of claim 9, wherein the receiving of the identification number is performed by monitoring for the identification number only for a predetermined period of time after detecting the attachment of the charging unit.

11. A method executed by an electronic device comprising:
receiving an identifier that uniquely identifies a charging unit;
determining at least one application program stored on the electronic device that is associated with the identifier; and
invoking the at least one application program in response to the receiving of the identifier,
wherein the receiving step more specifically comprises:
monitoring an electrical signal output from a microphone that is embodied in the electronic device;
identifying a modulated signal carried on the electrical signal, the modulated signal embodying the unique identifier.

12. The method of claim 11, further comprising:
detecting the attachment of the charging unit with the electronic device.

13. The method of claim 12, wherein the receiving of the unique identifier is performed by monitoring for the unique identifier only for a predetermined period of time after detecting the attachment of the charging unit.

* * * * *